United States Patent
Cochran et al.

(10) Patent No.: US 9,030,327 B2
(45) Date of Patent: May 12, 2015

(54) SYSTEM AND METHOD FOR DETECTING RADIATION EMISSIONS

(75) Inventors: Edward L. Cochran, Minneapolis, MN (US); Kwong Wing Au, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 834 days.

(21) Appl. No.: 13/167,372

(22) Filed: Jun. 23, 2011

(65) Prior Publication Data

US 2012/0327231 A1   Dec. 27, 2012

(51) Int. Cl.
*H04N 7/18* (2006.01)
*G01V 5/00* (2006.01)
*G01T 1/00* (2006.01)
*G06F 15/00* (2006.01)

(52) U.S. Cl.
CPC ............ *G01V 5/0066* (2013.01); *G01V 5/0075* (2013.01)

(58) Field of Classification Search
CPC ......... G01N 23/00; G01S 13/04; G01S 13/86; G01S 13/88; G01S 7/412; G01V 5/0075
USPC .......... 340/600; 250/390.07, 336.1, 395, 394, 250/301, 302; 702/127, 150
See application file for complete search history.

(56) References Cited

U.S. PATENT DOCUMENTS

| | | | |
|---|---|---|---|
| 4,374,378 A * | 2/1983 | Lee ............................. | 340/566 |
| 6,188,318 B1 * | 2/2001 | Katz et al. ................. | 340/545.3 |
| 6,727,506 B2 * | 4/2004 | Mallette ...................... | 250/394 |
| 7,045,788 B2 | 5/2006 | Iwatschenko-Borho et al. | |
| 8,173,970 B2 * | 5/2012 | Inbar ....................... | 250/390.07 |
| 2008/0012749 A1 | 1/2008 | Frank | |

\* cited by examiner

*Primary Examiner* — Brian Zimmerman
*Assistant Examiner* — Bhavin M Patel
(74) *Attorney, Agent, or Firm* — Schwegman Lundberg & Woessner, P.A.

(57) ABSTRACT

A method includes receiving radiation sensor data from two radiation sensors that are positioned separately from each other about a path. Position information identifying a source of radiation as it passes by the two radiation sensors is received. The sensor data from the two radiation sensors is time shifted to correlate the sensor data to the identified source of radiation. The time shifted sensor signals are summed.

9 Claims, 6 Drawing Sheets

SENSOR 1

SENSOR 2

SYSTEM AND METHOD FOR DETECTING RADIATION EMISSIONS

GOVERNMENT FUNDING

This invention was made with Government support under Grant Number HR0011-10-C-0070 awarded by DARPA. The United States Government has certain rights in the invention.

BACKGROUND

Radiological weapons (e.g., dirty bombs) are a threat to national security, and a means of detecting them before they are placed at their target is desirable. Ideally, the weapons or their radiological precursors should be detected as they are transported on highways, while still far from their target. However, because the radiological sources used in these weapons are relatively low intensity, and current radiation sensors have relatively low sensitivity, identifying these radiological sources in moving traffic is difficult, and subject to false alarms due to naturally occurring background radiation.

In general, cars move past fixed sensors too quickly to enable the sensors to integrate over enough time to create a clear signal. The current approach to detection of sources in traffic is to place sensors at points where traffic is expected to be moving slowly (e.g., at traffic signals).

SUMMARY

A method includes receiving radiation sensor data from two radiation sensors that are positioned separately from each other about a path. Position information identifying a source of radiation as it passes by the two radiation sensors is received. The sensor data from the two radiation sensors is time shifted to correlate the sensor data to the identified source of radiation. The time shifted sensor signals are summed.

The summed time shifted sensor signals may be compared to a threshold to determine whether a source or radiation, such as a vehicle exceeded the threshold. If exceeded, information identifying the vehicle is provided to authorities.

In one embodiment, an algorithm is used to locate sensor(s) based on the expected signal size from the smallest target desired to be detected and the expected shielding and dwell time of the target within the range of a single sensor. The algorithm indicates how many sensors to use and optimal placing for a given potential target (or associated defensive perimeter crossing). Radiation detectors may then be placed based on both dwell time and video-enabled stacking.

In a further embodiment, statistical combining of sensor inputs, based on the actual speed of traffic (determined via video, or road loops, etc) is used to increase the probability of detecting a target based on the summation of multiple sub-threshold signals. The stacking depends on the video signal, and can be done multiple different ways for each potential vehicle (e.g., in a multilane highway or in cases where vehicles are following closely).

In yet a further embodiment, a method of identifying which of potentially many vehicles contain a source or target is done using cctv video synchronized with sensor data collection. When an alarm is triggered, a specific vehicle (or perhaps a very small number of suspect vehicles) may be associated with the alarm, rather than just knowing for example that the radiation alarm on a particular river crossing was triggered.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

A system and method integrates surveillance video cameras and multiple radiation detectors to enable virtual integration of radiation sensing from vehicles that are otherwise moving too quickly to generate a strong enough signal. The radiation sensors may sense gamma rays, which may be emitted from radioactive material, including low level radiation which might be emitted from dirty bombs. Various sources may include medical waste (Cs-137, Co-60, Tc-99m) and industrial sources (Ir-192, Co-60) among others. In various embodiments, the physics of the sensor geometry may be used to extract from a continuous sensor data stream those radiological events that can be associated with a single vehicle, and enables data from each vehicle to be integrated using multiple cameras and sensors. Correlating sensing data with video images of potential sources, enables identification of the sources for use by authorities.

In some embodiments, sensors and cameras may be placed based on the expected average speed of vehicles. Sensors may also be placed on the inside radius of curves and freeway ramps, and at stop signs and stop lights to increase sensor dwell time and decrease the number of sensors required to adequately cover an approach to a potential target. The use of video also enables widely dispersed sensors to integrate data on the same vehicle as it travels on a long freeway segment toward a likely target. Many different types of radiation sensor technologies or combinations of technologies may be used.

Figure 1:
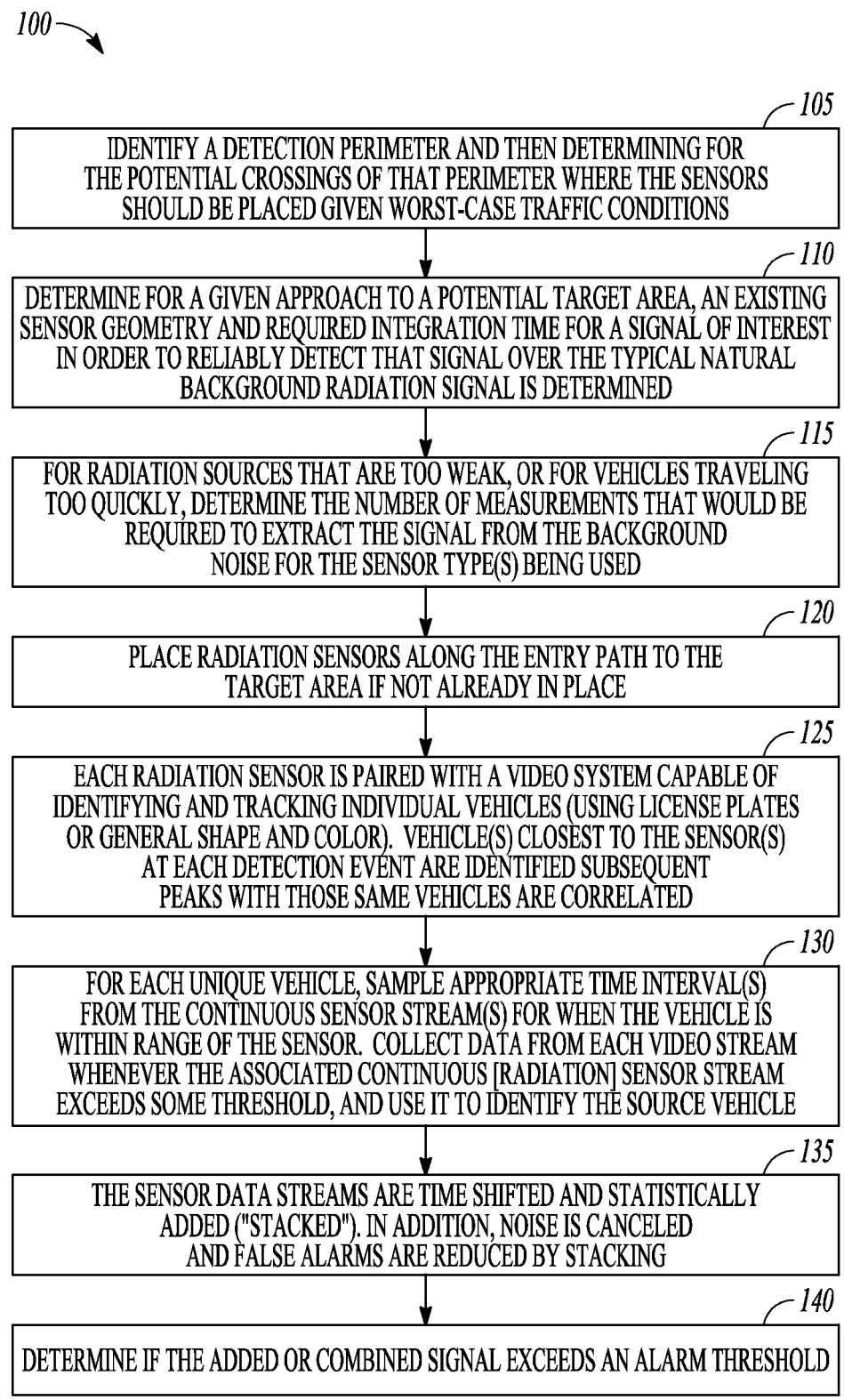
FIG. 1 is a flow chart illustrating a method of using multiple radiation sensors and cameras to detect radiation according to an example embodiment.

FIG. 1 is a flow diagram illustrating a method 100 of setting up and using a combined radiation sensor and video integrated system. At 105, a detection perimeter is identified and potential crossings of that perimeter are identified where the sensors should be placed given worst-case traffic conditions (high congestion, high speed). For example, one may elect to use the entrance roads to a mall as the perimeter.

At 110, for a given approach to a potential target area, an existing sensor geometry and required integration time for a signal of interest in order to reliably detect that signal over the typical natural background radiation signal is determined. For radiation sources that are too weak, or for vehicles traveling too quickly, the number of measurements that would be required to extract the signal from the background noise for the sensor type(s) being used is determined at 115.

At 120, radiation sensors may be placed along an entry path to the target area. In some embodiments, sensors may already be in place, and the method 100 utilizes those existing sensors, optionally adding additional sensors if desired. Radiation sensor data from two radiation sensors that are positioned separately from each other about the entry path is received.

In one embodiment, an algorithm is used to locate sensor(s) based on the expected signal size from the smallest target desired to be detected and the expected shielding and dwell time of the target within the range of a single sensor. The algorithm indicates how many sensors to use and optimal placing for a given potential target (or associated defensive perimeter crossing). Radiation detectors may then be placed based on both dwell time and video-enabled stacking.

Once the sensor has been placed, at 125, each radiation sensor is paired with a video system capable of identifying and tracking individual vehicles (using license plates or general shape and color). The video is used to identify vehicle(s) closest to the sensor(s) at each detection event, and then correlate subsequent peaks with those same vehicles. Individual sensors can get false alarms due to background radiation, especially if the threshold for alarming is set low to detect well-shielded sources. The video helps eliminate false alarms as well as helping to determine which vehicles are causing the alarms.

At 130, for each unique vehicle, appropriate time interval(s) are sampled from the continuous sensor stream(s) for a period when the vehicle is within range of the sensor. The period may depend on the type and sensitivity of the radiation sensors and whether meaningful data may be obtained during the period. Generally, the period encompasses a time period when the vehicle is approaching until it has moved past the sensor and is out of range of the sensor. In one embodiment data is collected from each video stream whenever the associated continuous [radiation] sensor stream exceeds some threshold and is used to identify the source vehicle. In further embodiments, with proper placement, sensors having non-directional sensing capabilities are integrated with video, and the sensors can be fine-tuned for actual (versus expected) vehicle speed based on video data that provides actual speed, for example.

In a further embodiment, statistical combining of sensor inputs, based on the actual speed of traffic (determined via video, or road loops, etc) is used to increase the probability of detecting a target based on the summation of multiple sub threshold signals. The stacking depends on the video signal, and can be done multiple different ways for each potential vehicle (e.g., in a multilane highway or in cases where vehicles are following closely).

At 135, the sensor data streams are statistically added ("stacked"), and it is determined if the added or combined signal exceeds an alarm threshold at 140. The statistical adding includes time shifting the sensor data streams so that they synchronized to the time during which the vehicle passes each sensor. The stacking of the data streams may also provide for noise cancellation and false alarm reduction in addition to signal enhancement/enhanced sensitivity benefits In some embodiments, the placement of cameras and sensors can take advantage of existing terrain and traffic controls (lanes, bridges, ramps, etc); camera identification and hand-off of vehicles can be supplemented (and in some cases replaced) by physical parameters such as time×distance measures (when velocity is constant). The result is that a unique vehicle may be identified and provided to law enforcement and security personnel when associated with a radiation threat.

In yet a further embodiment, a method of identifying which of potentially many vehicles contain a source or target is done using cctv video synchronized with sensor data collection. When an alarm is triggered, a specific vehicle (or perhaps a very small number of suspect vehicles) may be associated with the alarm, rather than just knowing for example that the radiation alarm on a particular river crossing was triggered.

Figure 2:
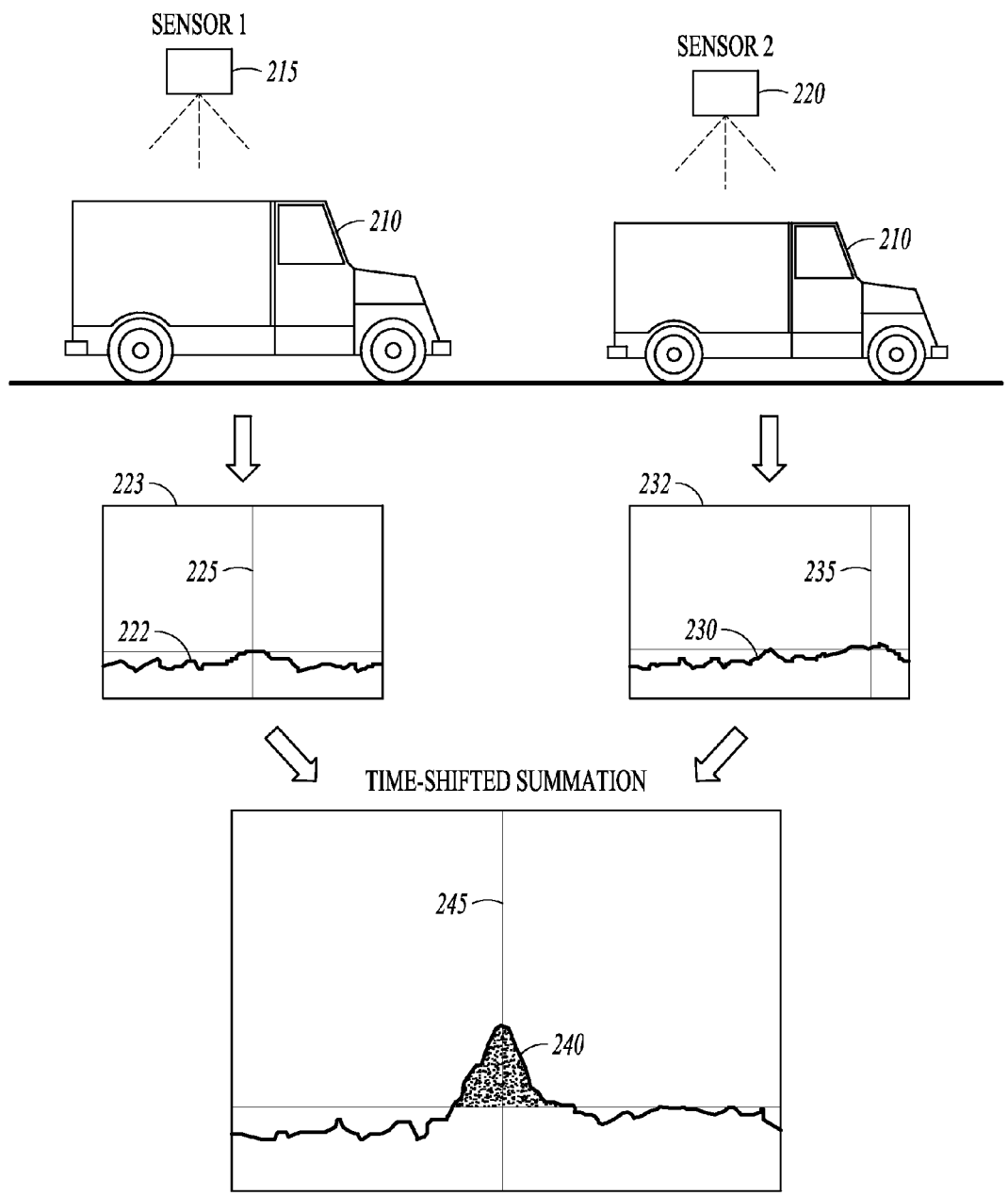
FIG. 2 is a block and graph representation of a vehicle passing two sensors, and time shifting and combining sensor signals according to an example embodiment.

FIG. 2 is a block and graph representation of a vehicle 210 passing by two sensors 215 and 220 at different times. The vehicle 210 may be travelling on a road, and passes sensor 215 first, resulting in a signal 222 illustrated in a first graph 223 of signal intensity versus time. A crosshair 225 illustrates a portion of the signal corresponding to the vehicle passing near the sensor 215 at a first time. The phrase passing near the sensor may refer to the vehicle passing near a point of optimal sensor sensitivity to sources of radiation in the vehicle, which may or may not correspond to the proximity of the vehicle to the sensor. In some embodiments, both sensitivity and proximity correspond to the same vehicle position with respect to the sensor. The vehicle 210 then passes the second sensor at\ a second time, resulting in a signal 230 in a second graph 232 of signal intensity versus time. A crosshair 235 indicates the signal 230 corresponding to the vehicle 210 passing the sensor. At 240 in a graph of signal versus time, the signals 222 and 230 are time shifted such that the detected signals at the time each passed by the respective sensors are correlated, and summed. A crosshair 245 represents the shifted time at which the vehicle passed near each sensor.

Figure 3A:
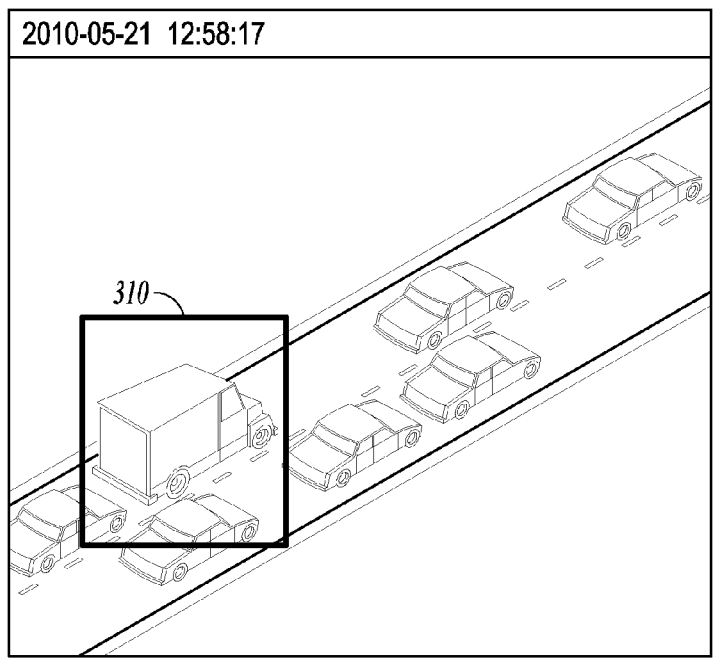
FIGS. 3A and 3B are representations of an identified vehicle at two sensor locations according to an example embodiment.
Figure 3B:
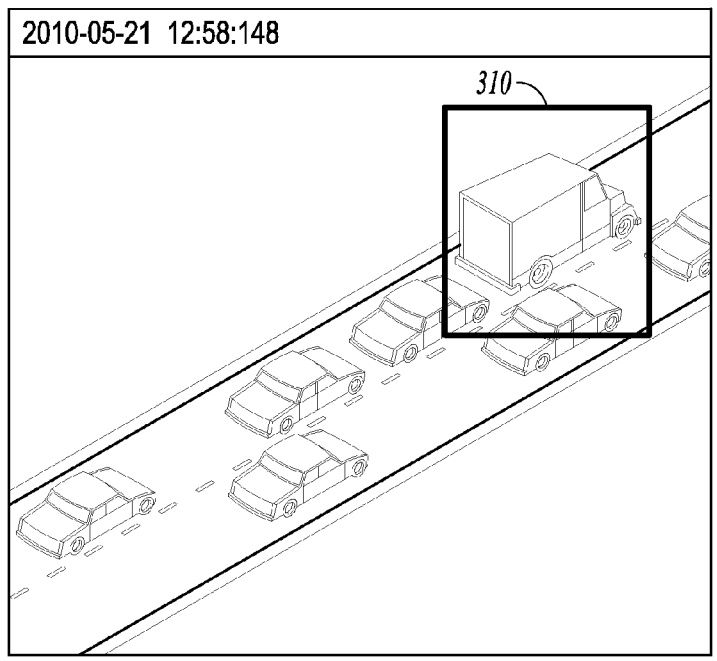

In various embodiments, many different constructs may be used to synchronize the signals for combination. In one embodiment, images of the vehicle, indicated in a square 310 in FIGS. 3A and 3B, which are images from video frames associated with the respective sensors 215 and 220. In this example, the same video camera may be used for both sensors. The vehicle of interest in square 310 is tracked in the video and correlated to the known positions of the sensors. Thus, it is a simple matter to correlate the images in the video frames to when the vehicle is closest to the sensors, and then time shift the signals from the sensors and add them.

A cross hair 245 indicates the time shifted and summed signal peak, which exceeds a threshold 250 for radiation detection. This threshold also may be seen in the graphs showing the individual sensor signals, and it is noted that no single sensor exceeded the threshold, yet the summed signal 240 does exceed it.

In further embodiments, the speed of a vehicle may be measured via the video camera by comparing positions in video frames with the times between frames. This provides a distance versus time measurement that can be used to determine the length of time it will take the vehicle to traverse a known distance between two sensors and correlate and add the sensor signals corresponding to the vehicle. The calculation assumes that the speed remains constant.

Figure 4A:
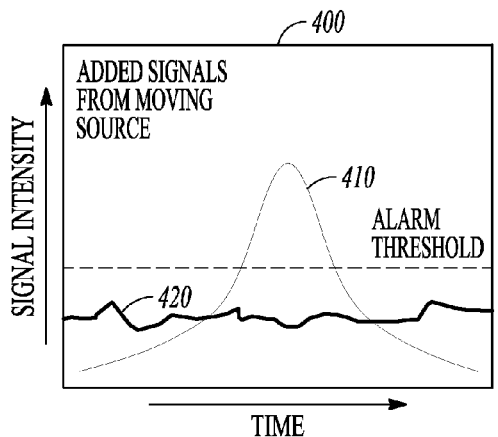
FIGS. 4A, 4B, 4C, and 4D are graphs of signal intensity versus time at one or more sensors according to an example embodiment.

FIG. 4A is a graph 400 illustrating a signal 410 intensity versus time from a sensor corresponding to a slow moving source, or a strong source. Signal 410 is below an alarm threshold 415 initially, and as time progresses, surpasses the alarm threshold 415. Background signal return is illustrated at 420. The signal 410 illustrates the benefit of placing sensors near choke points that result in vehicles slowing down. The radiation sensors are exposed to the sources for a longer period of time with a slower moving vehicle and are more likely to result in a greater signal strength. Corners, controlled intersections, known traffic patterns and other situations may help identify optimal positions in which sensors may be most effective for a source which may not otherwise be detected when moving at higher speeds.

Figure 4B:
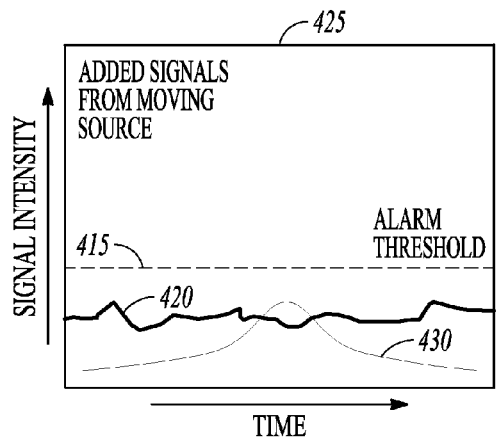

FIG. 4B is a graph 425 illustrating a signal 430 intensity versus time from a sensor that is detecting a fast moving or weak source. Signal 430 does not pass the alarm threshold 415. Thus, a single sensor that is not correlated to other sensors, may be incapable of detecting such sources.

Figure 4C:
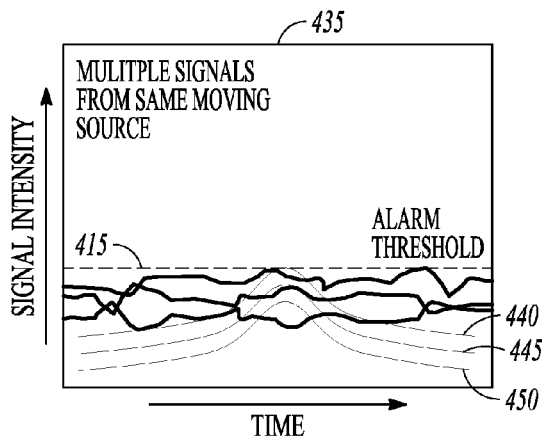

FIG. 4C is a graph 435 illustrating multiple signals 440, 445, 450 from multiple sensors detecting the same fast moving or weak source detected by the sensor providing signal 430. Each signal also is shown with associated background signal return. None of the signals 440, 445, and 450 exceed the alarm threshold 415. The signals are show time shifted and correlated to the single source such that it appears that the source passes the respective sensors at the same time.

Figure 4D:
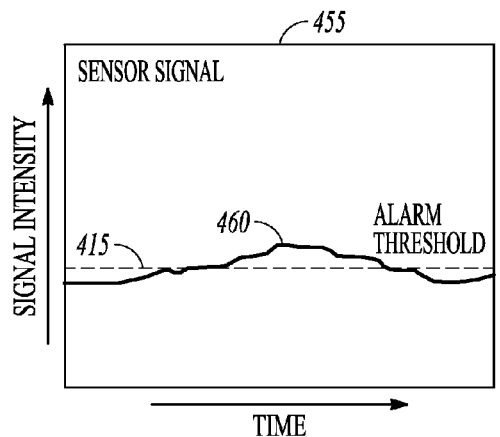

FIG. 4D is a graph 455 illustrating a combined signal 460 which is a sum of the multiple signals 440, 445, and 450 with background signal return removed. The combined signal 460 does exceed the alarm threshold 415, indicating that the source is a threat. The video feed or feeds that were used to correlate the signals and identify the source may also be used to provide sufficient identification information to proper officials to allow them to identify and deal with the source.

Figure 5:
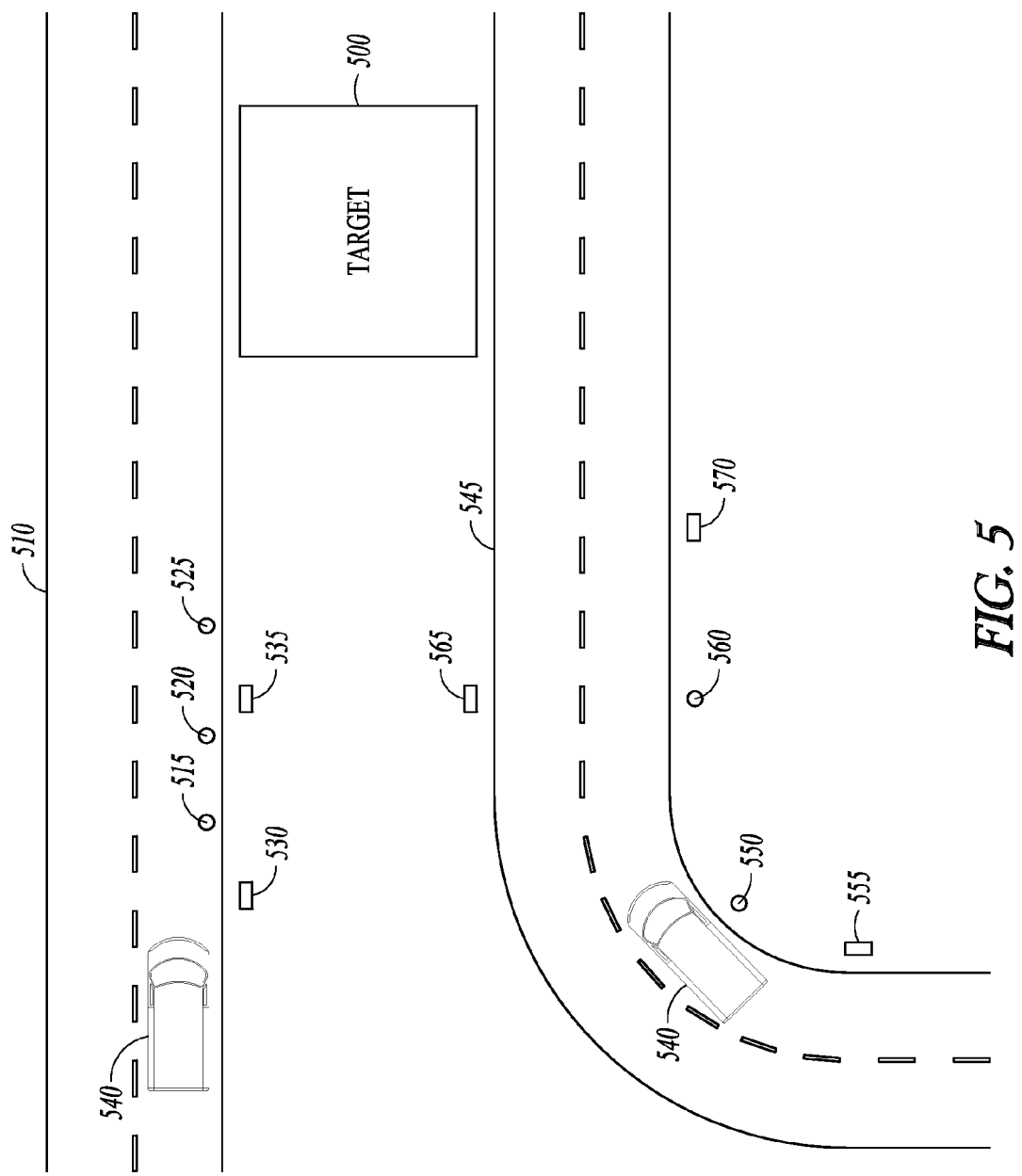
FIG. 5 is a block representation of sensor and video camera placements on multiple paths leading to a potential target according to an example embodiment.

FIG. 5 illustrates a potential target 500 to be protected. A first approach, such as road 510 is fit with multiple radiation sensors 515, 520 and 525 as road 510 approaches the target 500. The sensors in one embodiment are positioned about the road in a manner to optimize the ability of the sensors to sense radiation emissions from vehicles driving on the road toward the target 500 in one embodiment. The actual positions of the sensors may depend on the sensing characteristics of the sensors, which may vary in different sensors. In some embodiments, the sensors may be positioned to the side of the road or path, and in others, the sensors may be embedded in the road or even suspended above the road.

Two cameras 530 and 535 are associated with the radiation sensors and provide images of potential sources, such as vehicle 540 travelling down the road 510 toward target 500. In one embodiment, camera 530 tracks sources for both sensors 515 and 520, while camera 535 tracks sources for sensor 525. The cameras may be pointed toward, away, or at traffic in various embodiments, so long as it can provide adequate information to identify the vehicles and provide location information corresponding to the positions of the sensors.

In one embodiment, road 510 is not controlled by stoplights, and is fairly straight. Vehicles may travel at speeds greater than 40 kilometers per hour. The sensors may thus be sensing a higher velocity source, and obtain lower sensor returns that may not rise above individual sensor alarm thresholds. In this example, the three sensors are spaced apart and used to provide a time shifted and summed signal, that is more likely to exceed the alarm threshold. The dimensions are not to scale in FIG. 5, as the sensors may be located quite some distance from the target in order to provide sufficient warning time.

FIG. 5 also illustrates a second road 545 that may be used to approach the target 500. In this embodiment, a sensor 550 is placed proximate a corner of road 545, with an associated camera 555 to track vehicles 540 as they approach and pass the sensor 550. The corner results in a slowing of the vehicle, allowing the sensor 550 to more likely detect sources of radiation within the vehicle. Further down the road 545 toward the target 500, a sensor 560 is placed near a controlled portion of the road as indicated by a traffic signal or stop sign 565. A video camera 570 is associated with sensor 560. Vehicle 540 may be slowed by traffic signal 565, or may not be slowed. Thus, sometimes sensor 560 will provide sufficient signal to exceed the threshold when vehicles are slowed, or may not if a vehicle is not slowed by traffic signal 565. The signals from sensors 550 and 560 may be time shifted and combined in some embodiments to assist with proper detection.

In some embodiments, each vehicle on the road or path is tracked, and corresponding sensor signals are time shifted and summed. In further embodiments, a lower threshold radiation threshold than the alarm threshold for a sensor may be established to trigger the tracking and corresponding time shifting and summing of signals for a vehicle. In still further embodiments, the alarm threshold for a single sensor may be set at a lower level than the alarm threshold for time shifted and summed sensor signals. While the number of sensors having their signals time shifted, summed, and compared to an alarm threshold are shown in examples as two or three sensors, many more sensors may be included in further embodiments. In some embodiments, when a summed signals exceeds the alarm threshold, an image of the vehicle, along with time and position information may be sent to authorities for action. The information that is sent may also include a license plate or other identifier of the vehicle. Further information may be obtained from external databases and also be provided, such as make and model, year, color, owner, GPS transponder information, and any other type of available and useful information. The vehicle may also be tracked using GPS or further video cameras, and real time location information may be streamed to the authorities in some embodiments.

Figure 6:
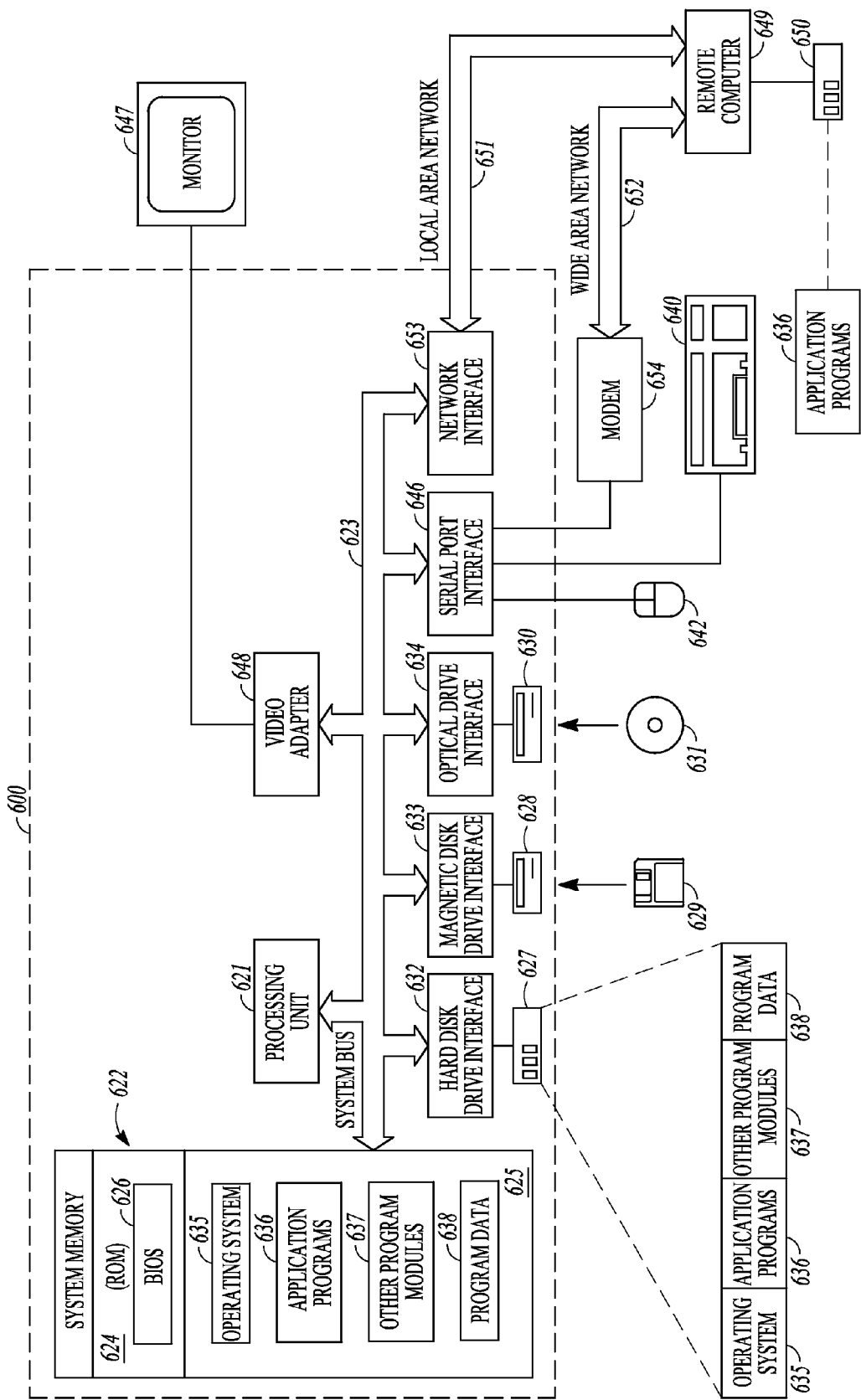
FIG. 6 is a block diagram of an example programmed computer system for performing methods of various embodiments.

FIG. 6 is a block diagram of a computer system to implement methods according to an example embodiment. In the embodiment shown in FIG. 6, a hardware and operating environment is provided that executes programming to perform the methods described above. The programming may include video processing algorithms to identify, locate, and track vehicles. Such programming is generally available from many sources. In various embodiments, the sensors and video cameras may be hardwired or wireless coupled to transmit data to the computer system either directly, or after the data is pre-processed by other systems, such as video processing systems.

As shown in FIG. 6, one embodiment of the hardware and operating environment includes a general purpose computing device in the form of a computer 600 (e.g., a personal computer, workstation, or server), including one or more processing units 621, a system memory 622, and a system bus 623 that operatively couples various system components including the system memory 622 to the processing unit 621. There may be only one or there may be more than one processing unit 621, such that the processor of computer 600 comprises a single central-processing unit (CPU), or a plurality of processing units, commonly referred to as a multiprocessor or parallel-processor environment. In various embodiments, computer 600 is a conventional computer, a distributed computer, or any other type of computer or microprocessor or other processing circuitry and software.

The system bus 623 can be any of several types of bus structures including a memory bus or memory controller, a peripheral bus, and a local bus using any of a variety of bus architectures. The system memory can also be referred to as simply the memory, and, in some embodiments, includes read-only memory (ROM) 624 and random-access memory (RAM) 625. A basic input/output system (BIOS) program 626, containing the basic routines that help to transfer information between elements within the computer 600, such as during start-up, may be stored in ROM 624. The computer 600 further includes a hard disk drive 627 for reading from and writing to a hard disk, not shown, a magnetic disk drive 628 for reading from or writing to a removable magnetic disk 629, and an optical disk drive 630 for reading from or writing to a removable optical disk 631 such as a CD ROM or other optical media.

The hard disk drive 627, magnetic disk drive 628, and optical disk drive 630 couple with a hard disk drive interface 632, a magnetic disk drive interface 633, and an optical disk drive interface 634, respectively. The drives and their associated computer-readable media provide non volatile storage of computer-readable instructions, data structures, program modules and other data for the computer 600. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 629, optical disk 631, ROM 624, or RAM 625, including an operating system 635, one or more application programs 636, other program modules 637, and program data 638. Programming for implementing one or more processes or method described herein may be resident on any one or number of these computer-readable media.

A user may enter commands and information into computer 600 through input devices such as a keyboard 640 and pointing device 642. Other input devices (not shown) can include a microphone, joystick, game pad, satellite dish, scanner, or the like. These other input devices are often connected to the processing unit 621 through a serial port interface 646 that is coupled to the system bus 623, but can be connected by other interfaces, such as a parallel port, game port, or a universal serial bus (USB). A monitor 647 or other type of display device can also be connected to the system bus 623 via an interface, such as a video adapter 648. The monitor 647 can display a graphical user interface for the user. In addition to the monitor 647, computers typically include other peripheral output devices (not shown), such as speakers and printers.

The computer 600 may operate in a networked environment using logical connections to one or more remote computers or servers, such as remote computer 649. These logical connections are achieved by a communication device coupled to or a part of the computer 600; the invention is not limited to a particular type of communications device. The remote computer 649 can be another computer, a server, a router, a network PC, a client, a peer device or other common network node, and typically includes many or all of the elements described above I/O relative to the computer 600, although only a memory storage device 650 has been illustrated. The logical connections depicted in FIG. 6 include a local area network (LAN) 651 and/or a wide area network (WAN) 652. Such networking environments are commonplace in office networks, enterprise-wide computer networks, intranets and the internet, which are all types of networks.

When used in a LAN-networking environment, the computer 600 is connected to the LAN 651 through a network interface or adapter 653, which is one type of communications device. In some embodiments, when used in a WAN-networking environment, the computer 600 typically includes a modem 654 (another type of communications device) or any other type of communications device, e.g., a wireless transceiver, for establishing communications over the wide-area network 652, such as the internet. The modem 654, which may be internal or external, is connected to the system bus 623 via the serial port interface 646. In a networked environment, program modules depicted relative to the computer 600 can be stored in the remote memory storage device 650 of remote computer, or server 649. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. A method comprising:
receiving radiation sensor data from two radiation sensors that are positioned separately from each other about a path;
receiving position information identifying a source of radiation as it passes by the two radiation sensors;
time shifting the sensor data from the two radiation sensors to correlate the sensor data to the identified source of radiation;
summing the time shifted sensor signals; and
comparing the summed time shifted sensor signals to an alarm threshold, wherein no one sensor signal exceeds the threshold when the summed time shifted sensor signals exceed the alarm threshold.

2. The method of claim 1 and further comprising providing identifying information of a source whose summed time shifted sensor signals exceeded the alarm threshold.

3. The method of claim 1 and further including receiving radiation sensor data from at least one further radiation sensor along with position information, time shifting the further radiation sensor data, and adding it to the summed time shifted signals prior to comparing the summed time shifted sensor signals to the alarm threshold.

4. A system comprising:
a computer system to receive radiation sensor data from two radiation sensors that are positioned separately from each other about a path;
an input coupled to the computer system to receive position information identifying a source of radiation as it passes by the two radiation sensors;
a processor in the computer system to time shift the sensor data from the two radiation sensors to correlate the sensor data to the identified source of radiation and sum the time shifted sensor signals and compare the summed time shifted sensor signals to an alarm threshold, wherein no one sensor signal exceeds the threshold when the summed time shifted sensor signals exceed the alarm threshold.

5. The system of claim 4 and further comprising an output to provide identifying information of a source whose summed time shifted sensor signals exceeded the alarm threshold.

6. The system of claim 4 wherein the input receives radiation sensor data from at least one further radiation sensor along with position information, and wherein the processor time shifts the further radiation sensor data, and adds it to the summed time shifted signals.

7. A non-transitory computer readable storage device having instructions to cause a computer to execute a method, the method comprising:
receiving radiation sensor data from two radiation sensors that are positioned separately from each other about a path;
receiving position information identifying a source of radiation as it passes by the two radiation sensors;
time shifting the sensor data from the two radiation sensors to correlate the sensor data to the identified source of radiation;
summing the time shifted sensor signals; and
comparing the summed time shifted sensor signals to an alarm threshold, wherein no one sensor signal exceeds the threshold when the summed time shifted sensor signals exceed the alarm threshold.

8. The non-transitory computer readable storage device of claim 7 wherein the method further comprises providing identifying information of a source whose summed time shifted sensor signals exceeded the alarm threshold.

9. The non-transitory computer readable storage device of claim 7 wherein the method further includes receiving radiation sensor data from at least one further radiation sensor along with position information, time shifting the further radiation sensor data, and adding it to the summed time shifted signals.

* * * * *